United States Patent [19]

Walker et al.

[11] Patent Number: 4,928,119

[45] Date of Patent: May 22, 1990

[54] MOUNT FOR LINEAR ASSEMBLY

[75] Inventors: Jimmy P. Walker, Rochester; James T. Barton, Fairport, both of N.Y.

[73] Assignee: Eastman Kodak Company, Rochester, N.Y.

[21] Appl. No.: 239,886

[22] Filed: Sep. 2, 1988

[51] Int. Cl.$^5$ ............................................. G01D 15/14
[52] U.S. Cl. ...................................... 346/108; 355/128
[58] Field of Search ................. 346/76 L, 108, 107 R, 346/160, 139 R; 355/128, 130, 131

[56] References Cited

U.S. PATENT DOCUMENTS

| | | | |
|---|---|---|---|
| 4,278,982 | 7/1981 | Cholet | 346/108 |
| 4,780,730 | 10/1988 | Dodge et al. | 346/108 |

Primary Examiner—Bruce A. Reynolds
Assistant Examiner—Mark Reinhart
Attorney, Agent, or Firm—Leonard W. Treash

[57] ABSTRACT

A mount maintains a linear assembly, for example an LED printhead assembly, in operative relation to a rotary component whose location and orientation is not always precisely determinable. The mount is particularly useful when the rotary component is routinely removable from the apparatus, for example, if the rotary component is a roller about which is trained a web which must be replaced periodically and upon which the printhead assembly acts.

The mount contacts the rotary component restricting movement of the printhead assembly relative to the rotary component about x and y axes generally orthogonal to the primary axis of the rotary component but permits movement of the printhead assembly with the rotary component. The printhead assembly is supported by a mechanism which includes a set of flexure members which in combination both resiliently urge the assembly against the rotary component and also permit its rotation about the x and its y axes and linear movement parallel to all axes while preventing its rotation about the primary axis.

31 Claims, 8 Drawing Sheets

MOUNT FOR LINEAR ASSEMBLY

TECHNICAL FIELD

This invention relates to a mount for a linear assembly, for example, a linear LED printhead assembly, which mount controls the location and orientation of the linear assembly with respect to a rotary component of an apparatus, for example, a nonimpact printer.

BACKGROUND ART

U.S. Pat. No. 4,728,981 issued Mar. 1, 1988 to K. C. Koek et al shows an LED printhead assembly including a linear array of LED's on a suitable support and an associated lens structure. The patent discloses a mechanism for mounting the array of LED's and the lens structure with respect to each other and also with respect to a web-type electrophotographic apparatus. That particular mounting structure is used commercially on high-speed, high-volume, nonimpact printers.

In that mounting structure, the printhead assembly is rigidly attached to a holding mechanism for the bearings of a roller supporting a photoconductive web. That rigid attachment uses mounting pins which permit removal of the printhead assembly and reinsertion of it without additional adjustments. Because of the rigid relationship between the printhead assembly and the bearings for the roller, focus is readily maintained on the photoconductive web.

This structure is suitable for such high volume applications where the exact location of the bearings of the roller relative to certain locating structure associated with the bearings is readily maintainable. However, there are other applications in which the exact location of the roller is not readily maintained. For example, it is much less costly to provide a support for a roller that tolerates some misalignment or inaccuracy in location. Similarly, the roller can be part of a support, commonly called a "film core" which is different from the frame of the apparatus to which the printhead assembly is fixed. If the core is removable to replace the belt, it may be prohibitively costly to assure that the core replacement process exactly positions the roller with respect to a rigidly fixed printhead assembly.

U.S. Pat. No. 4,703,334, granted Oct. 27, 1987 to Mochimaru et al, shows a structure in which a printhead assembly is rigidly fixed to the frame of an apparatus and a photoreceptive web is urged against the printhead assembly by a resiliently urged back-up roller that contacts both the web and key printhead assembly contact surfaces. This structure corrects minor variations in locations of the belt (or a drum) but has relatively few degrees of freedom.

DISCLOSURE OF THE INVENTION

It is the object of the invention to provide a mount for a linear assembly which maintains the linear assembly in operative relation to a rotary component having a primary axis, despite angular displacement of the primary axis of the rotary component about x and y axes generally orthogonal to the primary axis and each other.

These and other objects are accomplished by a mount which includes means fixed to the linear assembly for contacting the rotary component restricting movement of the assembly about the x and y axes relative to the rotary component but permitting such movement of the assembly with the rotary component, and means supporting the assembly and preventing movement of the assembly about the primary axis while permitting movement of the assembly about the x and y axes with the rotary component.

According to a preferred embodiment, the invention is applied to a linear writer assembly, such as a linear LED printhead, a lens and suitable support structure for the printhead and lens.

According to a further preferred embodiment the mount includes a plurality of flexure means supporting the linear assembly relative to a frame which flexure means, in combination, permit rotation of the assembly about the x and y axes while preventing rotation about the primary axis.

According to a further preferred embodiment the mount includes a plate and the flexure means includes at least three flexure arms between the plate and the linear assembly which permit displacement of the assembly parallel to the y and primary axes and do not permit rotation of the assembly about any of the axes, the y and primary axes being generally orthogonal to the optical axis or axes of the assembly.

According to a further preferred embodiment the flexure means includes a flexure member supporting the plate relative to a frame of the apparatus which member permits rotation of the plate around both x and y axes and does not permit rotation about the primary axis.

According to a further preferred embodiment the linear assembly is a printhead assembly designed for use with an apparatus in which the rotary component is a roller which supports a light sensitive web and the roller is part of a film core which is removable from the apparatus to replace the web. The mount for the printhead assembly has a center of gravity and a flexure hinge attaching the mount to the frame of the apparatus which, when the mount is attached to the frame and is otherwise unsupported, causes the mount to be receptive to replacement of the core in the apparatus. The mount includes surfaces which contact the film core as it is being replaced to move the mount into operative position relative to the roller. The flexure members are designed to facilitate this movement of the assembly and mount into operative relationship as the core is being replaced in the apparatus.

This mount provides extremely accurate positioning of a linear assembly with respect to a roller or other rotary component whose position is not absolutely determined and such accuracy is accomplished with a structure that is quite inexpensive to manufacture, especially in quantity, and requires minimum adjustment in assembly and use.

The mount is particularly useful with an apparatus employing a removable film core as described above and in more detail below.

BEST MODE OF CARRYING OUT THE INVENTION

Although this invention can be used with other types of apparatus, it will be illustrated by its most probable application in a nonimpact electrophotographic printer using an LED printhead.

Figure 1:
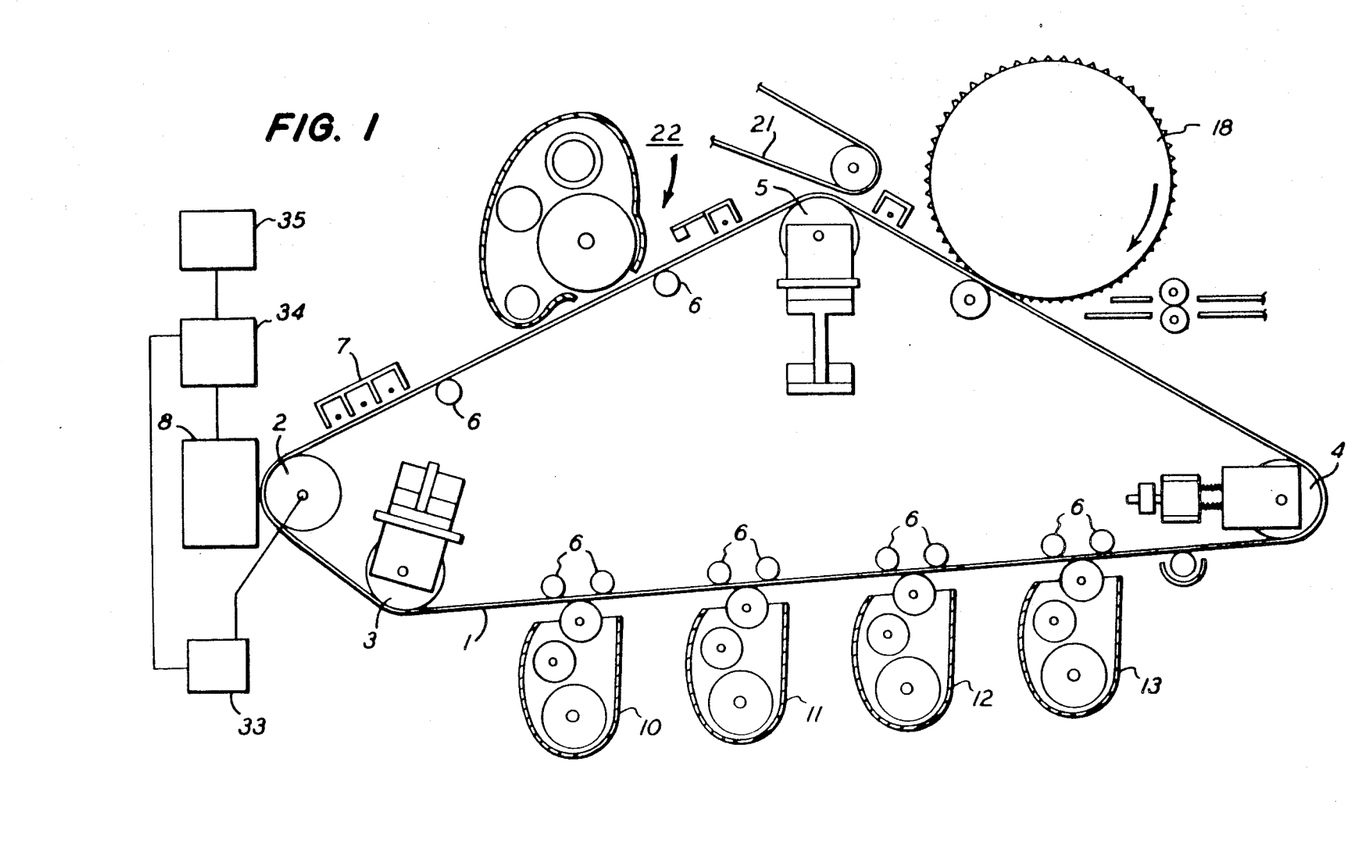
FIG. 1 is a schematic side view of an electrophotographic apparatus of a type in which the invention is useful.

According to FIG. 1 an electrophotographic printer includes a removable film core generally designated as 9 which includes an endless electrophotographic web, belt or film 1 trained about a series of rollers 2, 3, 4 and 5 and film skis 6. The rollers and skis are attached to side plates shown, in part, in FIGS. 9-11 and which make up the film core and which can be removed from the apparatus for replacement of the belt 1. In the basic electrophotographic process the belt 1 has one or more photoconductive layers on it. The belt is uniformly charged at a charging station 7 then exposed at an exposure station 8 and toned at one of toner stations 10, 11, 12 or 13. The resulting toner image is transferred to a receiving sheet at transfer station 18 and the receiving station is separated from the belt 1 and transported to a fuser, not shown, by a transport mechanism 21. The belt is then cleaned at a cleaning station 22 for reuse in the process, all as is well known in the art. Four toner stations 10, 11, 12 and 13 are shown permitting the application of four different colored toners to a plurality of images on the belt, which images can be transferred in registration at transfer station 18 to make a multicolor image, also as is well known in the art.

The exposure station 8 includes an LED printhead which will be described in more detail with reference to the other figures. It is driven by suitable electronics 34 as controlled by an encoder 33 which monitors the rotational displacement of printhead roller 2, also as is well known in the art. The suitable electronics 34 may receive information from a scanner, a computer, a memory or other similar source 35.

Figure 2:
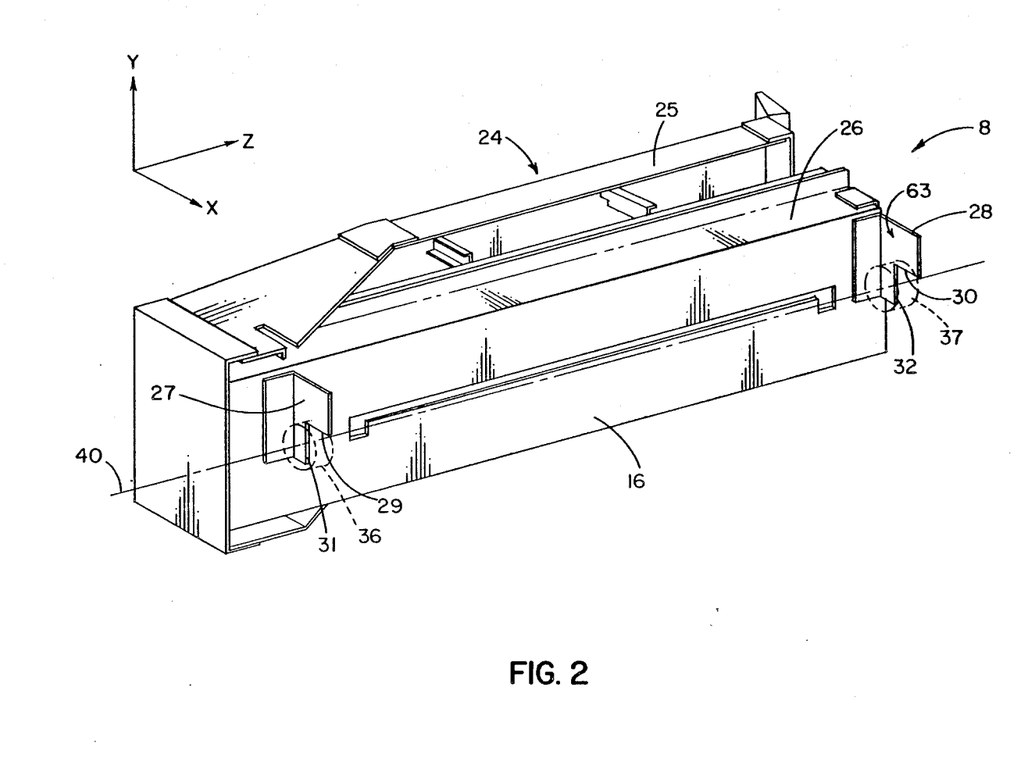
FIG. 2 is a perspective view of a mount for a printhead assembly, which mount is constructed according to the invention.
Figure 3:
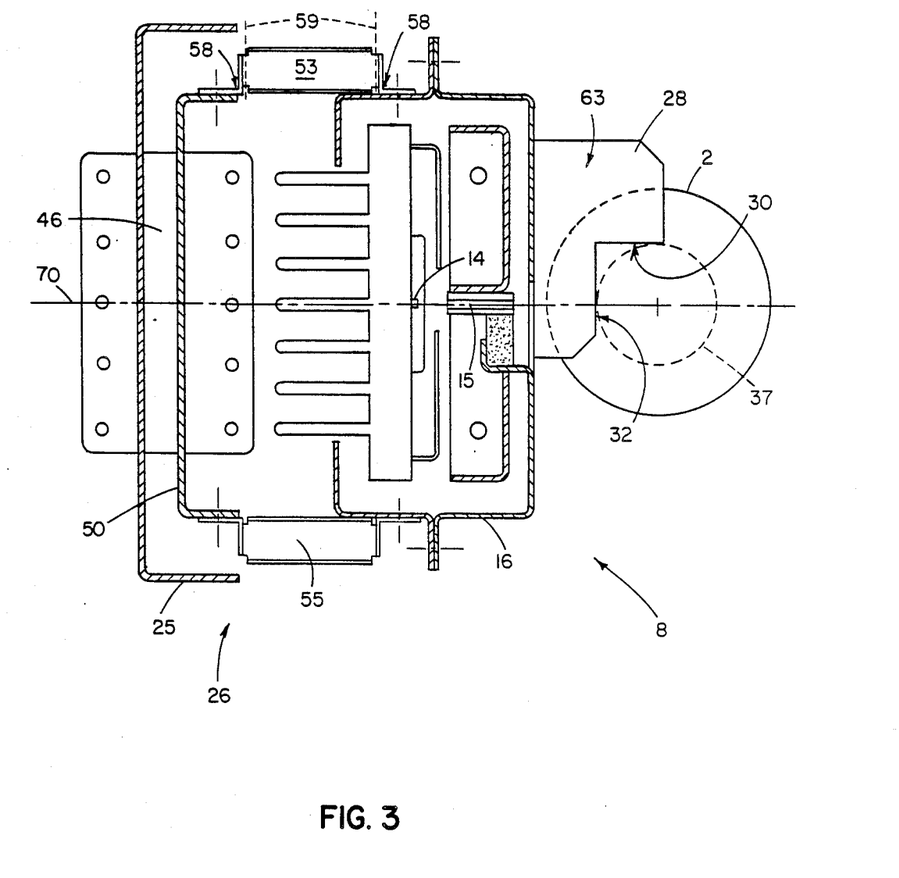
FIG. 3 is a side cross-section of a writer assembly a portion of which is shown in FIG. 2, the side cross-section being taken along the lines 3—3 shown in FIG. 11.

According to FIGS. 2 and 3, the exposure station 8 includes a printhead assembly and a mount 24 for the printhead assembly. The printhead assembly includes both a linear LED printhead 14 and an imaging device 15 such as a conventional gradient index lens array. The LED printhead 14 and the lens array 15 are optically located with respect to each other by a suitable support housing 16 to define an optical axis or axes 70. The support housing 16 includes locating members 27 and 28 having orthogonal relatively linear locating surfaces 29 and 30 which are parallel to the x axis and 31 and 32 which are parallel to the y axis. A planar locating surface 63 is located on member 28.

The printhead assembly 14 and 15 and support housing 16 with locating members 27 and 28 are precisely constructed as a unit, herein called a "writer assembly" 26. Accuracy of the system in high resolution printing depends upon the accuracy in locating printhead 14 and lens 15 with respect to locating surfaces 29-32.

Locating surfaces 29-32 are intended to mate with bearing surfaces 36 and 37, shown in phantom in FIG. 2 and which are part of printhead roller 2. Bearing surfaces 36 and 37 could also be part of the mounting structure for roller 2, providing they maintain a precise relation with roller 2. Bearing surfaces 36 and 37 are locating surfaces which cooperate with locating surfaces 29-32 to position the printhead assembly so that an image of LED printhead 14 is projected by lens 15 in focus on belt 1 as it is supported by printhead roller 2.

Printhead roller 2 will have variations in position and orientation. This is due to manufacturing tolerances in general and the fact that it is in a film core 9 which is removable. The location of roller 2 with respect to the frame of the apparatus is through the core and its mounting (not shown). The focal length of the lens array 15 is extremely short, giving very little depth of focus and requiring precise positioning of the printhead assembly with respect to roller 2. Mount 24 has been designed to provide that precise positioning despite previously mentioned variances in position and orientation of roller 2. FIG. 2 also shows a set of three orthogonal axes x, y and z which will be used to better explain the invention. The x axis is parallel to optical axes 70 (FIG. 3). The z axis as shown in FIG. 2 is parallel to the primary axis 40 of roller 2. The y axis is a vertical axis (as shown) and is orthogonal to the x and z axes. Because roller 2 rotates about primary axis 40, there is a tendency for the writer assembly 26 also to rotate about the primary axis. This rotation is prevented by mount 24 but virtually all other types of movement with change in position and orientation of roller 2 are permitted by a set of flexure members supporting the writer assembly 26 with respect to the frame of the apparatus.

The flexure members can best be seen in FIGS. 4-8. According to FIGS. 4 and 5 a support arm 25 is mounted to a portion of the frame 41 of the apparatus through a flexure hinge 42 formed by first and second flexure members 43 and 44. Flexure members 43 and 44 are attached by suitable means shown in FIG. 4 to adjoining corner surfaces of support arm 25 and to similar surfaces on a support 45. Support 45 is rigidly fastened to frame 41. The first and second flexure members are made of any durable metal such as steel having a stiffness which resists but permits some bending and twisting. The stiffness thus gives the support arm 25 a strong nominal position determined by the orientation of the corner surfaces of support 45. It also permits some rotational movement of the support arm 25 around the y axis as shown in FIG. 3. Movement about the x axis is prevented by the first flexure member 43, while movement about the z axis is prevented by the second flexure member 44.

Figure 4:
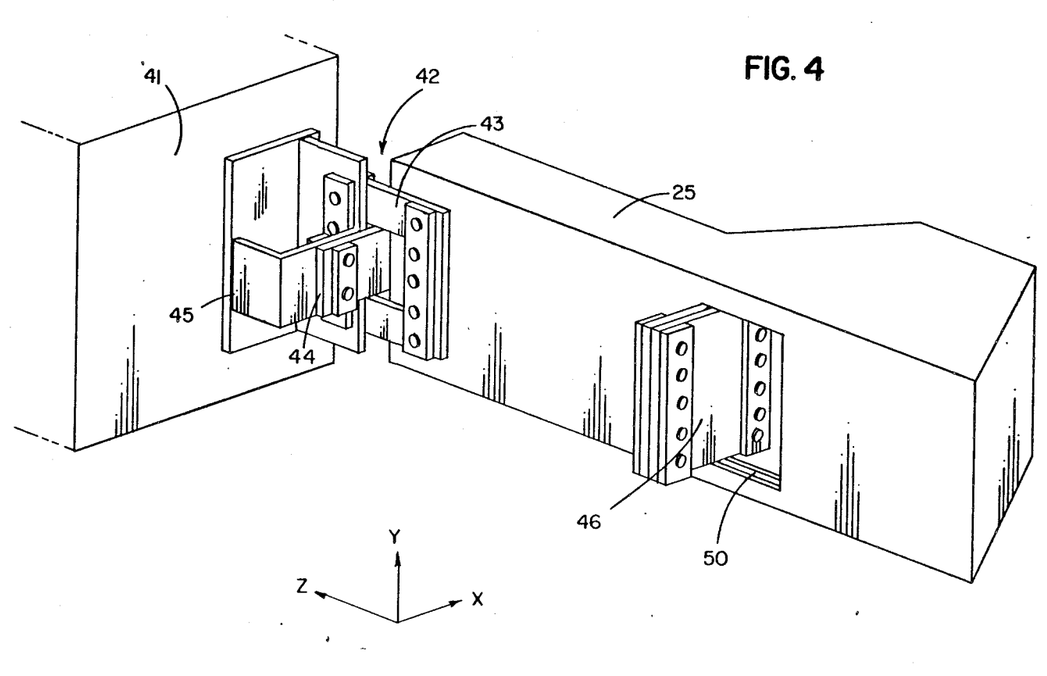
FIGS. 4 and 6 are rear and front perspective views, respectively, of a support arm forming part of the mount shown in FIG. 2.
Figure 5:
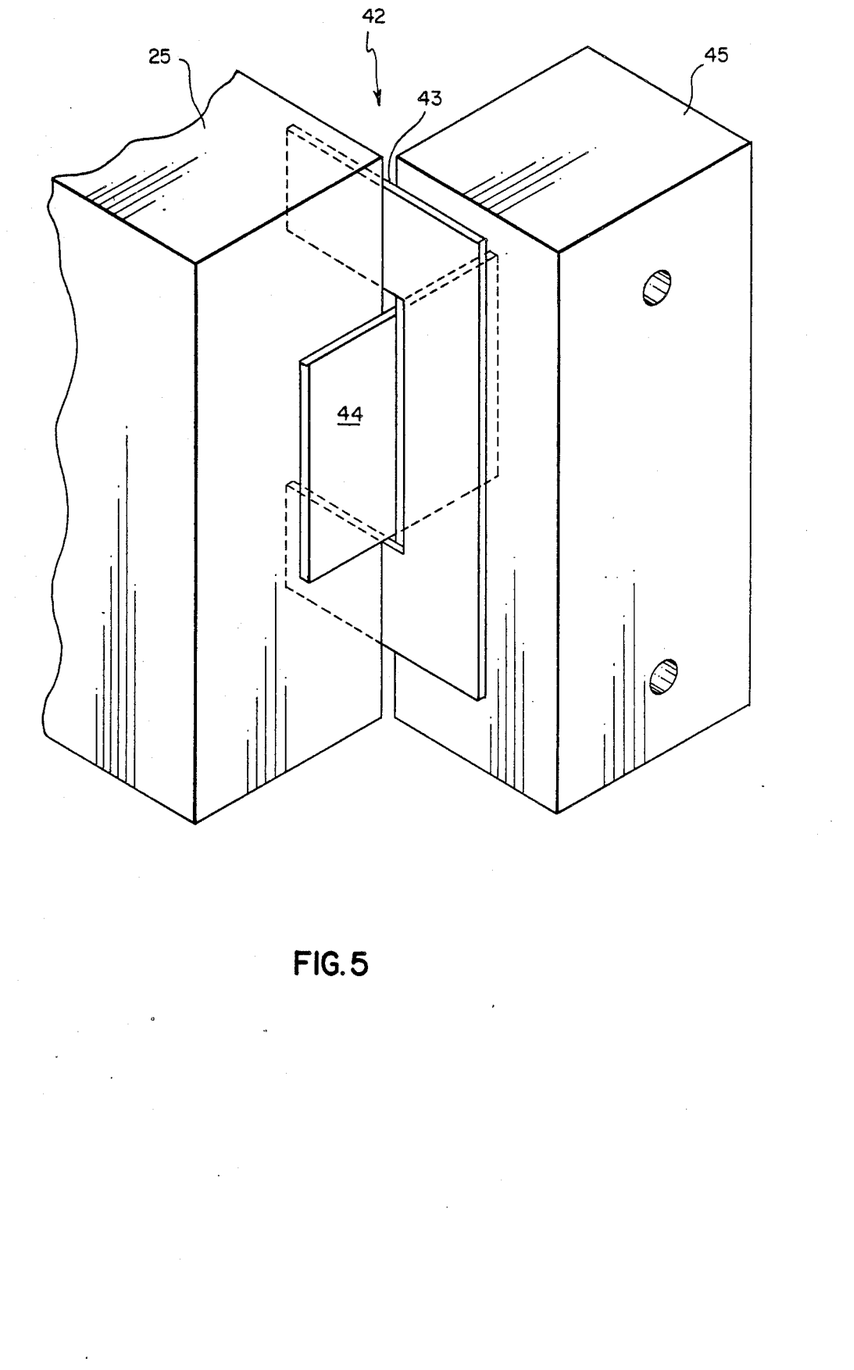
FIG. 5 is a perspective view of a flexure hinge also shown in FIG. 4.
Figure 6:
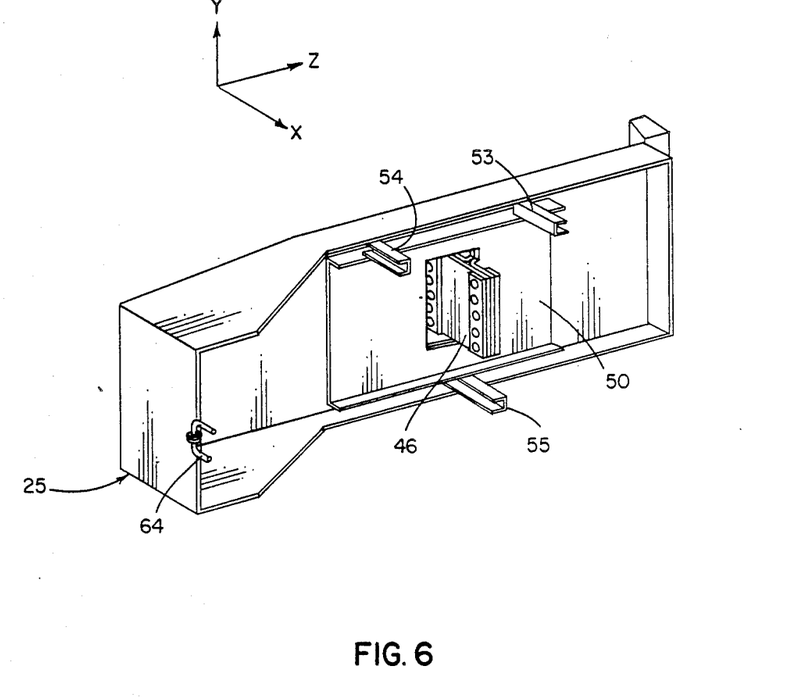

Referring now to FIGS. 4 and 6, a flexure plate 50 is mounted to support arm 25 by a third flexure member 46. Third flexure member 46 permits rotation of flexure plate 50 around the y axis by normal bending and around the x axis by twisting. It is mounted as shown prohibiting rotation around the z axis.

Figure 7:
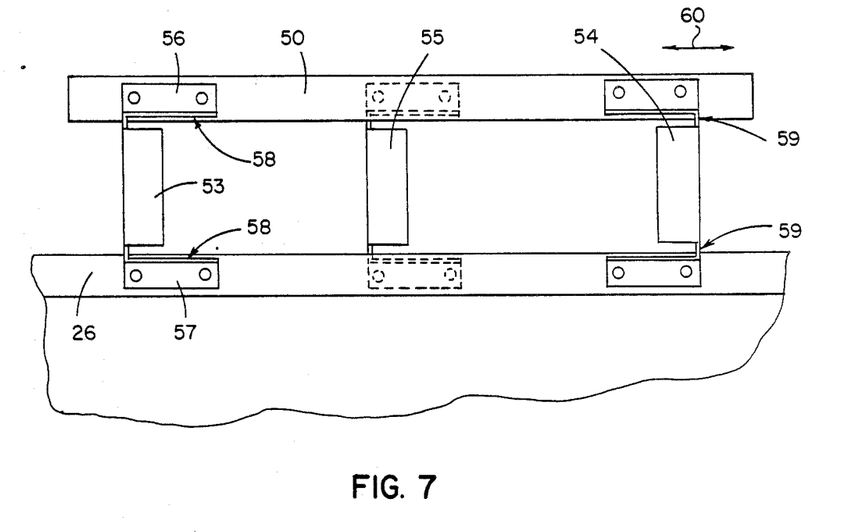
FIG. 7 is a top view with many portions eliminated illustrating the mounting of three flexure arms in the mount shown in FIG. 2.
Figure 8:
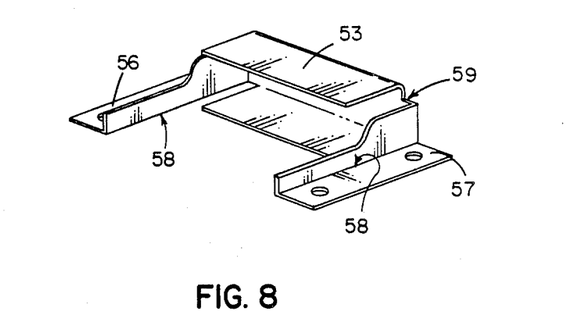
FIG. 8 is a perspective view of one of the flexure arms shown in FIG. 7.

Flexure plate 50 is mounted to the writer assembly 26 by three flexure arms 53, 54 and 55 shown in FIGS. 6, 7 and 8, which become fourth, fifth and sixth flexure members. Flexure arms 53 and 54 are located at the top of plate 50 and flexure arm 55 is located at the bottom of plate 50. As shown in FIG. 7, flexure arm 53 is attached to plate 50 by flange 56 and to the writer assembly 26 by a flange 57. Flexure arms 54 and 55 are similarly mounted. As seen in FIG. 8 flexure arm 53 is bendable along lines 58 permitting movement of the writer assembly 26 relative to plate 50 in a vertical direction as shown in FIG. 2, that is, generally parallel to the y axis. The flexure arm 53 is bendable along vertical lines 59 which permits movement of writer assembly 26 relative to plate 50 parallel to the z axis as shown by arrow 60 in FIG. 7. Rotational movement around any of the axes is prevented because the flexure arms are not compressible thereby forcing the writer assembly 26 and plate 50 to remain parallel.

Figure 9:
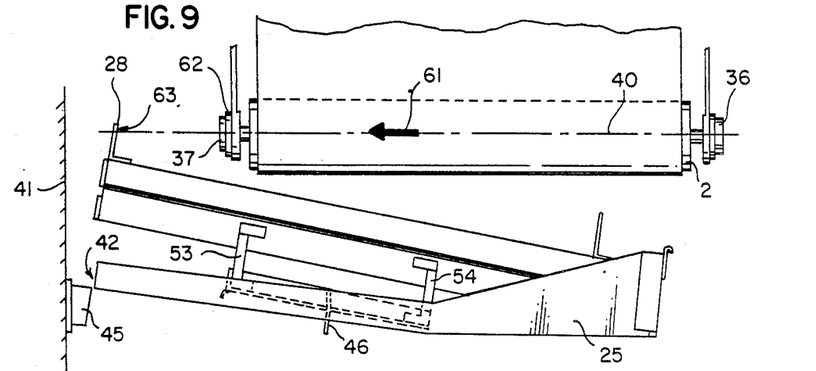
FIGS. 9, 10 and 11 are top views of a portion of the electrophotographic apparatus shown in FIG. 1, illustrating the replacement of a film core with respect to the mount constructed according to the invention.
Figure 10:
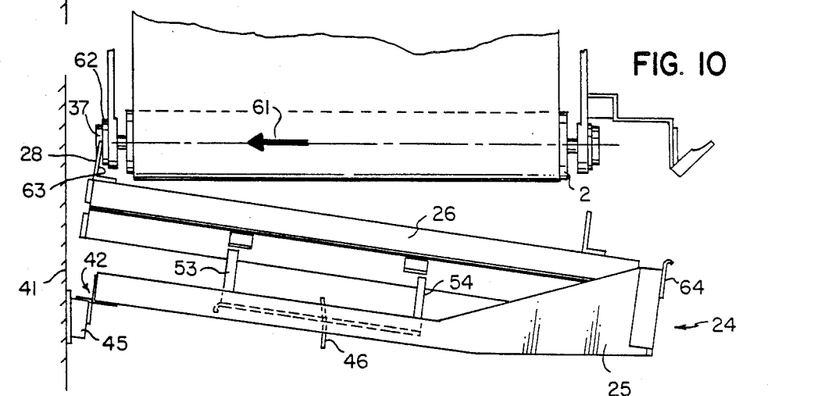
Figure 11:
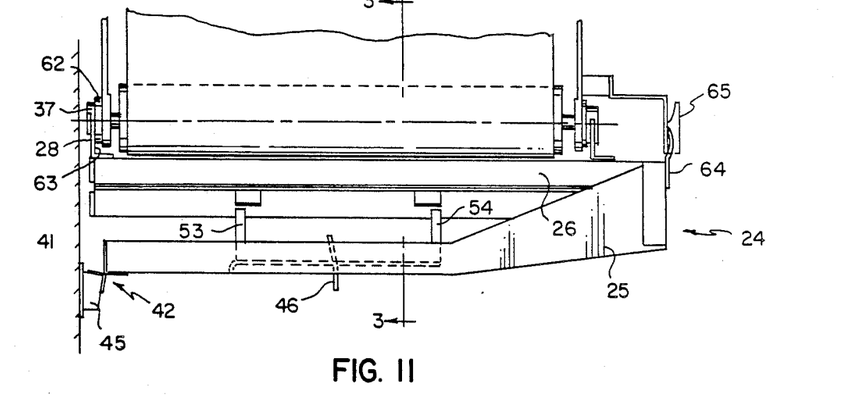

FIGS. 9, 10 and 11 are top views of the mount illustrating insertion of a film core in the apparatus. The corner surfaces on support 45, to which the first and second flexure members 43 and 44 are attached, are slightly oblique to the frame 41 so that when no film core is in the apparatus, support arm 25 tilts to the rear at a slight angle from perpendicular to frame 41, for example, 7½ degrees as shown in FIGS. 9 and 10. Writer assembly 26 also tilts rearward, as shown in FIG. 9, relative to support arm 25 as controlled by the angle of the support surfaces for the third flexure member 46. Further, writer assembly 26 has a center of gravity that causes its right end (FIG. 9) to tilt downward compared to support arm 25 with locating member 27 generally below locating member 28.

As the film core is inserted in the apparatus, printhead roller 2 moves generally in the direction shown by arrow 61. The mount 24 follows the roller 2 to assume its proper operative position with respect to roller 2 by the interaction of several surfaces. An end surface 62 of roller 2 contacts a flat locating surface 63 of locating member 28, which faces right in FIGS. 9-11, to urge writer assembly 26 toward the left and also to rotate writer assembly 26 counterclockwise around the y axis. The front corner of locating surface 29 (FIG. 2) is rotated into contact with bearing surface 36 and as writer assembly 26 rotates about the y axis surface 29 rides up on the bearing surface 36 causing comparable locating surface 30 (FIG. 2) on locating member 28 to rotate down onto bearing surface 37. The early part of the rotation of writer assembly 26 is permitted by third flexure 46 (compare FIGS. 9 and 10), while the second portion of that movement is a combination of flexure about third flexure member 46 and movement of support arm 25 around flexure hinge 42 (compare FIGS. 10 and 11). At the same time, flexure arms 53, 54, and 55 are permitting movement of writer assembly 26 generally parallel to the z axis, to the left as shown in FIGS. 9 and 10 and some movement parallel to the y axis in an upward direction. These combinations of permitted movements on the part of the mount 24 cause the mount to assume its correct location, shown in FIG. 11, with little, if any, attention paid to it by the service person while the core is being inserted. The movement about spaced flexure means 43, 44, and 46 both permitting rotation around the y axis permits the substantial open able of writer assembly 26 in FIG. 9 without a large angle and movement by support arm 25.

Once the core is in place, flexure arms 53, 54 and 55 are holding locating surface 63 against end surface 62 to assure proper location of the printhead assembly parallel to the z axis. Similarly, flexure arms 53, 54 and 55, having been flexed somewhat to permit the front printhead support 26 to move upward, now exert some downward force, holding locating surfaces 29 and 30 against bearing surfaces 36 and 37, respectively (See FIG. 2). A flexure clasp 65 on film core 9, similar to those used for many years on ski boots and the like, is fastened to complementary fastening structure 64 on support arm 25 to lock the mount 24 in place and urge locating surfaces 31, 32 against bearing surfaces 36 and 37. Once assembled, small changes in position of roller 2 around either the x or y axis or parallel to any of the three axes are permitted by the third flexure member 46 and the flexure arms 53, 54 and 55 with the printhead assembly maintaining its operative relation with respect to the roller 2 and web 1. None of the flexure members permit rotation of the printhead assembly or the mount about the primary axis 40 of roller 2, i.e., about the z axis.

Although this structure is precise and convenient and somewhat complicated to explain, once designed, it is quite inexpensive to manufacture in quantity. The flexure members themselves can be made out of a variety of metals readily available on the market and they are generally riveted in place as shown in the drawings.

Although this mount is particularly useful with respect to a roller and electrophotographic web structure, it can be used to mount any linear assembly to follow a rotary member when the same problems are faced. Similarly, the mount can follow a rotary member other than a roller, e.g., a drum, which drum may or may not have an electrophotosensitive surface thereon.

While the invention has been described in connection with a preferred embodiment thereof, it will be understood that variations and modifications can be effected within the spirit and scope of the invention as described hereinabove and as defined in the appended claims.

We claim:

1. A mount for maintaining a printhead assembly in operative relation to a rotary component having a primary axis, despite angular displacement of the primary axis of the rotary component about x and y axes generally orthogonal to the primary axis and each other, the printhead assembly being of the type projecting a predominantly linear image on a surface moving past the printhead assembly while the surface is supported by the rotary component, said mount comprising:
    means fixed to the printhead assembly for separably contacting the rotary component and restricting movement of the printhead assembly about the x and y axes relative to the rotary component, but permitting such movement of the printhead assembly with the rotary component, and
    means supporting the printhead assembly, for resiliently urging the contacting means into contact with the rotary component, and for preventing angular movement of the printhead assembly about the primary axis while permitting angular movement of the printhead assembly about the x and y axes with the rotary component.

2. The mount according to claim 1, wherein said supporting means includes
    means for attaching said mount to a frame of apparatus in which said printhead assembly and said rotary member are both receivable,
    a plurality of flexure means supporting said printhead assembly relative to said frame and, in combination, permitting rotation of said printhead assembly about said x and y axes while preventing rotation about said primary axis.

3. A mount according to claim 2, wherein said flexure means also permits linear movement of said printhead assembly generally parallel to the primary axis.

4. A mount according to claim 2, wherein said flexure means also permits linear movement of said printhead assembly parallel to the y axis, the x axis being parallel to the optical axes of the printhead assembly.

5. A mount according to claim 1, further including a locating surface contactable by a surface of the rotary member preventing movement of said printhead assembly relative to the rotary member in a direction parallel to the primary axis.

6. A mount according to claim 1 wherein said contacting means include two seating plates extending from the mount in a direction perpendicular to the primary axis and having seating surfaces extending in directions parallel to the x and y axes, which seating surfaces contact said rotary component to prevent movement of the printhead assembly about the x and y axes relative to the rotary component, and one of said plates includes a surface perpendicular to said primary axis which is contactable by a complementary surface on said rotary component to restrict movement of the printhead assembly parallel to the primary axis.

7. A mount according to claim 2, wherein printhead assembly has an optical axis or axes and said flexure means includes at least two spaced flexure means each permitting rotation of said printhead assembly about said y axis, wherein said x axis is generally parallel to the optical axis or axes of the printhead assembly.

8. A mount according to claim 2, wherein said mount includes a plate and said flexure means includes at least three flexure arms between said plate and the printhead assembly which permit displacement of the printhead assembly parallel to the y and z axes and do not permit rotation about the primary axis, the y and z axes being generally orthogonal to the optical axes of the printhead assembly.

9. A mount according to claim 8, wherein said flexure means further includes a flexure hinge supporting said plate relative to the frame which hinge permits rotation about the y axis and does not permit rotation about the primary axis.

10. For use in apparatus having a frame and a film core, the film core including an endless belt entrained about a series of rollers and support for said rollers, said film core being removable from said frame for replacement of said belt, a mount for maintaining a printhead assembly in a predetermined relation with one of said rollers, which roller has a primary axis about which the roller rotates in moving the belt past the printhead assembly for exposure, the roller being somewhat rotatably about x and y axes generally orthogonal to the primary axis and to each other and linearly displaceable parallel to all axes due to tolerances associated with removability of said film core, said mount comprising:
means for attaching said mount to the frame,
means fixed to the printhead assembly for contacting the roller restricting movement of the printhead assembly about the x and y axes relative to the roller but permitting such movement of the printhead assembly with the roller and
a plurality of flexure means supporting said printhead assembly relative to the frame and, in combination, resiliently urging said contacting means into following contact with said roller, and permitting rotation of the printhead assembly about the x and y axes and permitting linear movement parallel to the axes with the roller while preventing rotation of the printhead assembly about the primary axis.

11. The mount according to claim 10, wherein said flexure means and the center of gravity of said mount and printhead assembly are such that when the film core is removed from the apparatus the mount and printhead assembly is supported by the frame at an open angle with respect to reinsertion of the film core, thereby facilitating replacement of the film core in the apparatus.

12. The mount according to claim 10, wherein said contacting means includes a surface generally perpendicular to the primary axis which is positioned, when a film core is in the process of being replaced in the apparatus, to be contacted by a complimentary surface on the roller to move the mount to a position back into operative relation with the roller and belt as permitted by the flexure means.

13. A mount for maintaining a printhead assembly in a predetermined relation with a roller, which roller has a primary axis about which the roller rotates in moving an endless web past the printhead assembly for line by line exposure, the roller being displaceable about x and y axes generally orthogonal to the primary axis and to each other, said mount comprising:
means fixed to the printhead assembly for contacting the roller, restricting movement of the printhead assembly about the x and y axes relative to the roller but permitting such movement of the printhead assembly with the roller,
means for attaching said mount to a frame in apparatus in which said printhead assembly, endless web and roller are received, and
a plurality of flexure means supporting said printhead assembly relative to the frame and, in combination, resiliently urging said contacting means into contact with the roller, and permitting rotation of the printhead assembly about the x and y axes with the roller while preventing rotation of the printhead assembly about the primary axis.

14. A mount according to claim 13, wherein said flexure means includes at least two axially spaced flexure hinges each permitting rotation about said y axis and wherein said x axis runs generally parallel to the optical axis or axes of the printhead assembly.

15. A mount according to claim 13, wherein said mount includes a plate and said flexure means includes at least three flexure arms between said plate and the printhead assembly which permit linear movement of the printhead assembly parallel to the y axis and the primary axis and do not permit rotation about any axis, the x axis being generally parallel to the optical axis or axes of the printhead assembly.

16. A mount according to claim 13, wherein said mount includes a plate and said flexure means includes
at least three flexure arms between said plate and the printhead assembly which permit linear movement of the printhead assembly parallel to the primary axis and the y axis and do not permit rotation about any axis, the x axis being generally parallel to the optical axis or axes of the printhead assembly, and
at least two axially spaced flexure means supporting the plate with respect to the frame, each permitting rotation of the plate and printhead assembly about said y axis, and at least one such means permitting movement about said x axis.

17. A mount according to claim 15, wherein said flexure means further includes a flexure hinge supporting said plate relative to the frame which hinge permits rotation about the y axis and does not permit rotation about the primary axis.

18. A mount according to claim 17, wherein said flexure member is a single metal member which is mounted to bend directly about the y axis and to twist about the x axis, thereby permitting movement of said printhead assembly about both said x and y axes.

19. A mount according to claim 13, wherein said contacting means includes two seating plates extending from the mount in a direction perpendicular to the primary axis and each having seating surfaces extending in directions parallel to the x and y axes, respectively, which seating surfaces contact said roller to prevent movement of the printhead assembly about the x and y axes relative to the roller and one of said plates includes a surface perpendicular to said primary axis which is contactable by a complementary surface on said roller to restrict movement of the printhead assembly parallel to the primary axis relative to said roller.

20. A mount for maintaining a linear assembly in a predetermined relation with a roller, which roller has a primary axis about which the roller rotates, the roller being displaceable about x and y axes generally orthogonal to the primary axis and to each other, said mount comprising:
   contact means fixed with respect to the linear assembly and having assembly contact surfaces for contacting roller contact surfaces associated with the roller for restricting movement of the linear assembly about the x and y axes relative to the roller but permitting such movement of the linear assembly with the roller,
   means for attaching said mount to a frame in apparatus in which said roller is receivable, and
   a plurality of flexure means supporting said linear assembly relative to the frame and, in combination, urging the assembly contact surfaces into engagement with the roller contact surfaces, and permitting rotation of the assembly about the x and y axes while preventing rotation of the assembly about the primary axis.

21. The mount according to claim 20 wherein said flexure means also permits movement of said assembly parallel to the primary, x and y axes.

22. A nonimpact printer comprising:
   an endless electrophotographic web mounted around a series of rollers including a printhead roller, said printhead roller having a primary axis and being displaceable about x and y axes generally orthogonal to the primary axis and to each other,
   a writer assembly including
      an LED printhead,
      a gradient index lens optically aligned with said printhead,
      support housing for said printhead and lens, and
      means defining first locating surfaces fixed to said support housing and precisely positioned with respect to said printhead and lens,
   means associated with said printhead roller defining second locating surfaces fixed with respect to the primary axis of said printhead roller and contactable by said first locating surfaces to establish the location and orientation of the writer assembly with respect to the printhead roller,
   a support arm,
   a plurality of flexure means connecting said writer assembly to the support arm, said flexure means urging said first locating surfaces into contact with said second locating surfaces while permitting rotation of the writer assembly about he x and y axes with the printhead roller and preventing rotation of the writer assembly about the primary axis.

23. The nonimpact printer according to claim 22 including a frame and flexure means for securing said support arm to said frame.

24. The nonimpact printer according to claim 22 wherein said flexure means also permits movement of said writer assembly parallel to said primary, x and y axes.

25. The nonimpact printer according to claim 24 including a plate connected between said writer assembly and said support arm and wherein said flexure means includes flexure members connecting said support arm to said plate and said plate to said writer assembly.

26. The nonimpact printer according to claim 25 wherein said flexure members include at least three flexure members connecting said plate to said writer assembly which flexure members permit movement of the writer assembly with respect to the support arm parallel to the primary and the y axis, the x axis being parallel to the optical axis or axes of the lens.

27. The nonimpact printer according to claim 25 wherein said flexure members include a flexure member connecting said plate to said support arm, which flexure member is bendable to permit rotation of said writer assembly with respect to said support arm about said y axis and twistable to permit rotation of said assembly about said x axis, said x axis being parallel to the optical axis or axes of the lens.

28. The nonimpact printer according to claim 26 wherein said flexure members include a flexure member connecting said plate to said support arm, which flexure member is bendable to permit rotation of said writer assembly with respect to said support arm about said y axis and twistable to permit rotation of said assembly about said x axis.

29. The nonimpact printer according to claim 24 wherein said means defining first locating surfaces include means defining spaced locating surfaces which when contacting said second locating surfaces control rotational position of the writer assembly about the y axis and linear position parallel to the x axis and means defining spaced locating surfaces which when contacting said second locating surfaces control rotational position of the writer assembly around the x axis and linear position parallel to the y axis.

30. The nonimpact printer according to claim 29 wherein said means defining first locating surfaces includes means defining a planar surface parallel to the x and y axes which when contacting one of said second locating surfaces controls the linear position of said writer assembly parallel to the primary axis.

31. The nonimpact printer according to claim 30 wherein said means defining first contacting surfaces are two spaced locating members fixed to said support housing, each having a relatively linear surface parallel to the x axis and a relatively linear surface parallel to the y axis and one of said members having a planar locating surface parallel to both the x and y axes.

* * * * *